Figure 1:
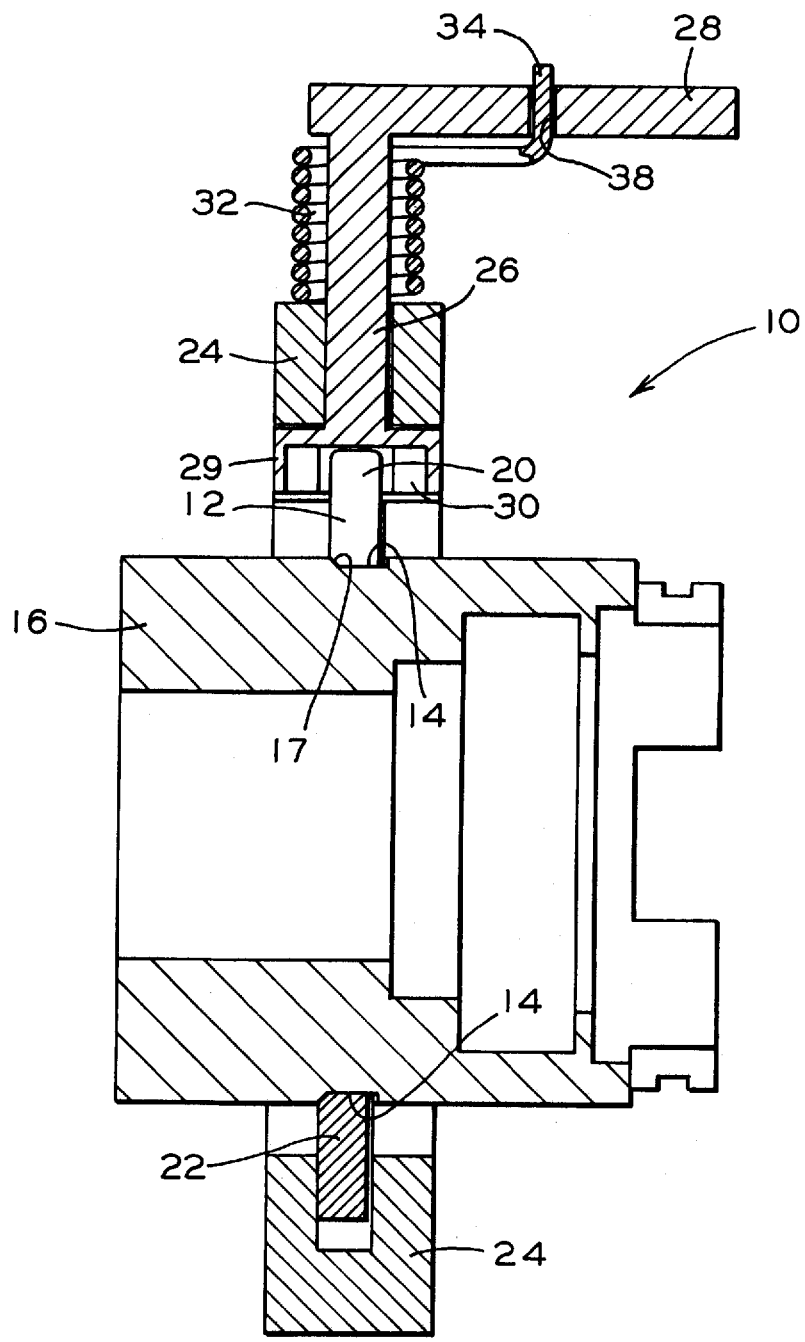

United States Patent

Cathcart et al.

[11] Patent Number: 5,848,550
[45] Date of Patent: Dec. 15, 1998

[54] PARKING BRAKE MANUAL RELEASE MECHANISM

[75] Inventors: Christopher A. Cathcart, Spartanburg; Roland S. Moore, Taylors, both of S.C.

[73] Assignee: Westinghouse Air Brake Company, Wilmerding, Pa.

[21] Appl. No.: 850,600

[22] Filed: May 2, 1997

[51] Int. Cl.⁶ .................................................. G05G 17/00
[52] U.S. Cl. ................... 74/2; 24/270; 188/265; 403/322; 403/325; 411/353
[58] Field of Search .................... 74/2; 24/270, 271, 24/278; 279/43.5; 188/265; 411/353

[56] References Cited

U.S. PATENT DOCUMENTS

| | | | |
|---|---|---|---|
| 2,063,419 | 12/1936 | Zongaro | 279/41 |
| 4,138,148 | 2/1979 | Zaremba | 403/322 X |
| 4,497,092 | 2/1985 | Hoshino | 24/271 X |
| 4,777,867 | 10/1988 | Severinsson et al. | 188/265 X |

*Primary Examiner*—Allan D. Herrmann
*Attorney, Agent, or Firm*—James Ray & Associates

[57] ABSTRACT

A quick relief mechanism including a sleeve having an external circumferential groove and a locking ring located on the sleeve and sized to seat in the groove. The locking ring is split at one location to provide split-end portions, and a rotatable clamping device is provided with a recess for receiving the split-end portions. The recess has narrow and wide dimensions that serve to engage and disengage the split-end portions of the locking ring to effect closing of the locking ring in the circumferential groove when the clamping device is rotated to present a narrow dimension to the split-end portions, and to open the locking ring when the wide dimension of the elongated slot is presented to the split-end portions.

6 Claims, 4 Drawing Sheets

5,848,550

PARKING BRAKE MANUAL RELEASE MECHANISM

THE BACKGROUND OF THE INVENTION

The present invention relates generally to a quick release mechanism that is particularly suitable for releasing parking brakes for passenger train applications through the invention is not limited thereto.

In a Cathcart et al. application Ser. No. 08/850,599 entitled "Spring Applied Parking Brake Actuator Having a Collet Style Slack Adjuster" which is concurrently filed with the present application, a parking brake piston is combined with a service brake piston in one compact actuator unit. The parking brake function in the Cathcart et application uses a spring applied air release style parking brake. In the absence of air pressure, the parking brake function of the actuator provides the breaking force through action of a spring. The disclosure of the Cathcart et al. application is incorporated herein by reference.

SUMMARY OF THE INVENTION

The present invention is directed to a device that mechanically engages a tubular member or sleeve and provides quick release of the member or sleeve. The device includes a split resilient ring seatable in a circumferential groove of the member, and has split end portions seated in a recess provided at one end of a rotatable shaft. The shaft and recess are biased in one rotated position by a torsion spring, the recess having a narrow dimension that secures the ring in the groove. The shaft and recess are rotatable to a second position against the bias of the spring, which position presents a wide dimension of the recess to the split ends of the ring. The ring can now expand outwardly from the tubular member and is thereby easily moved out of the groove in the member by a lateral force imposed on the ring. The quick release mechanism can allow parking brake force to be released manually if air cannot be restored to a parking brake piston.

OBJECTIVES OF THE INVENTION

A primary objective of the invention is to allow a workman to quickly and manually release an object held in place by the device of the invention.

Another objective of the invention is to provide a quick release device that is simple in construction, inexpensive to make and maintain, and easily manually operable without further attention once the release has been affected.

A further objective of the invention is to use a torsion spring to affect automatic return of a quick release handle after the handle has been manually operated to effect the quick release function.

THE DRAWINGS

Figure 2:
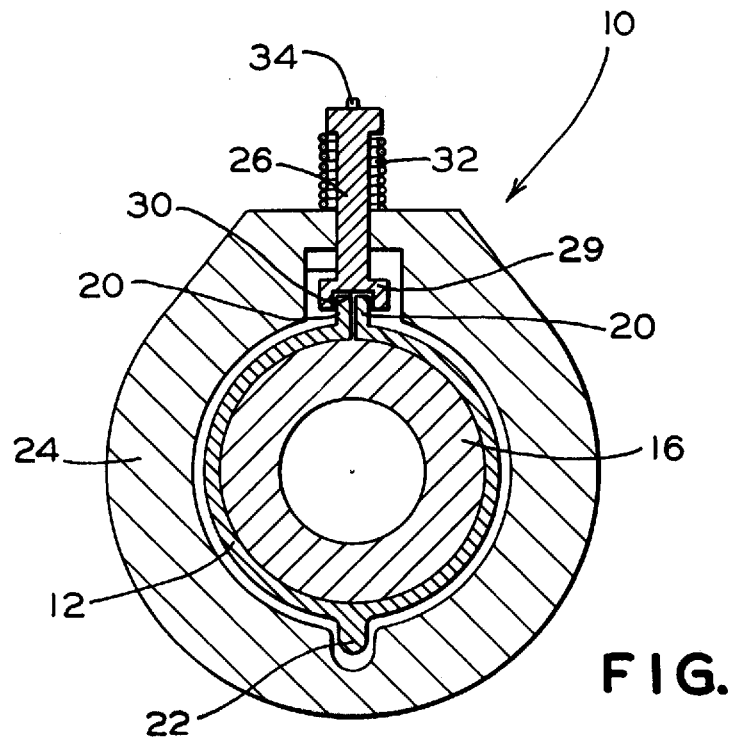
Figure 3:
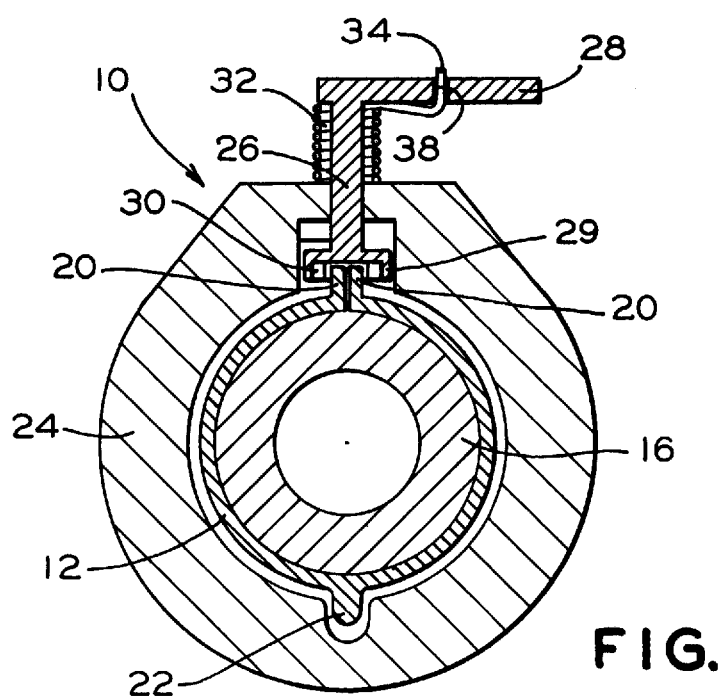
Figure 4:
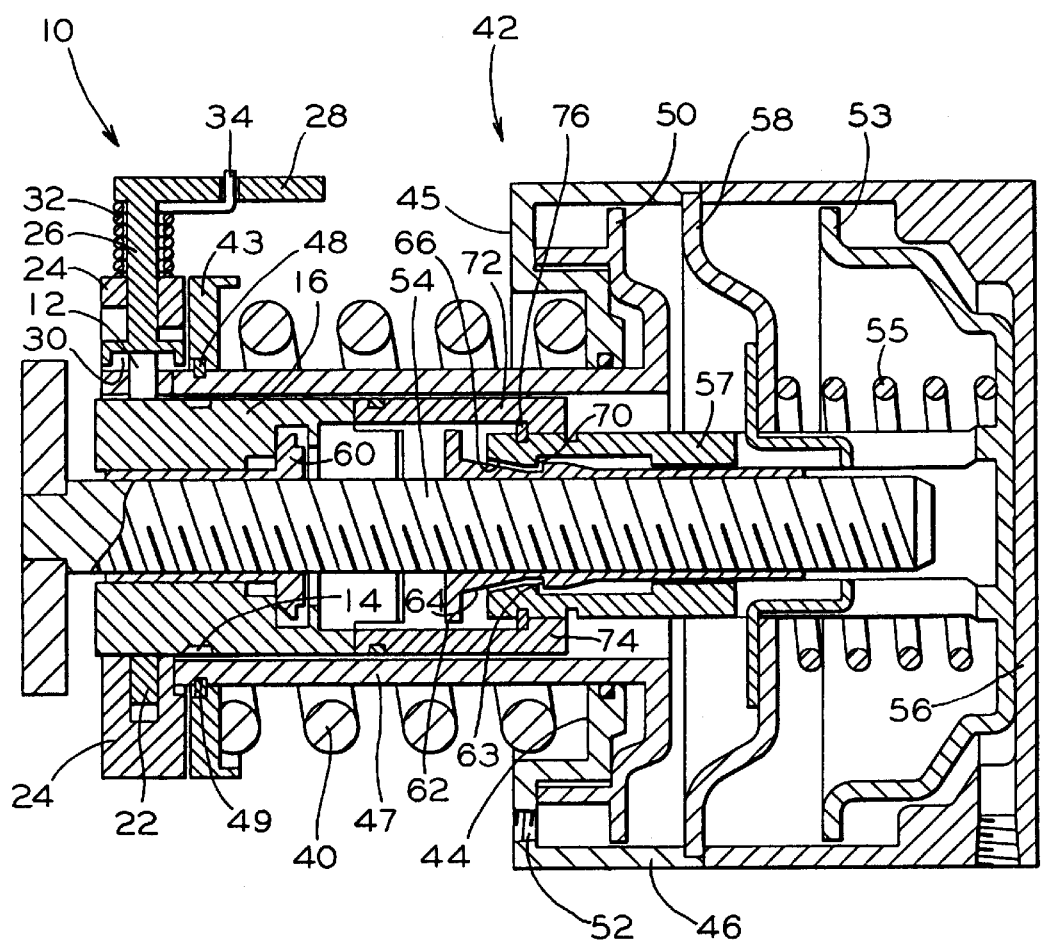
Figure 5A:
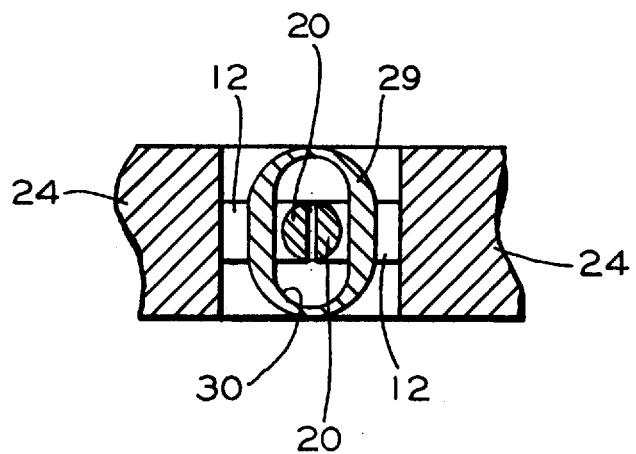
Figure 5B:
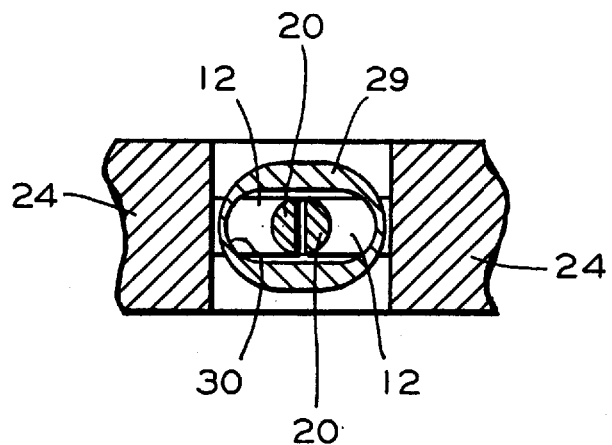

The advantages and objectives of the invention will be better understood from consideration of the following detail description and the accompanied drawings in which:

FIG. 1 is a longitudinal section of the quick release mechanism of the invention, FIG. 2 is a cross-sectional view of the mechanism of FIG. 1 in an unreleased state, FIG. 3 is a cross-sectional view of the mechanism in a brake release state, FIG. 4 is a longitudinal sectional view of a parking and service brake actuator using the mechanism of the invention for releasing the parking brake of the actuator, and FIG. 5A and 5B are partial plan views of the release mechanism of FIGS. 1 through 4 showing respectively unreleased and release states.

PREFERRED EMBODIMENT

Referring now to the drawings, FIGS. 1 to 3 thereof show the quick release mechanism of the invention. The mechanism is generally designated by reference numeral 10. The release mechanism includes a locking ring 12 sized to seat in a circumferential groove 14 provided in the outer surface of a circular sleeve 16. In cross section, ring 12 and groove 14 are generally rectangular in shape. As such, a forward corner of the groove and the corresponding inner forward corner of the ring can be chamfered at 17, as shown in FIG. 1, for reasons explained hereinafter.

Ring 12 is split at one location in its circumference and is provided two outwardly directed split end portions and extensions 20 that permit the ring to be clamped in and released from groove 14. At a location opposite the split end portions of the ring, the ring can be provided with a thick portion 22, as seen in FIGS. 2 and 3. Thick portion 22 strengthens the ring at the location at which the ring flexes when it moves into and out of groove 14 in a manner described hereinafter. Release mechanism 10 further includes a circular housing 24 that encompasses sleeve 16 and ring 12 at the longitudinal location of ring 12 and groove 14. Housing 24 contains a shaft 26 that is rotatable in the housing and has a release handle 28 located at an outer end of the shaft. The shaft has an inner end 29 that is enlarged somewhat to provide a recess 30 that receives split end portions 20 of locking ring 12. Handle 28 is maintained in a rotated position relative to split end portions 20 by a torsion spring 32 located on shaft 26 and an integral outwardly directed extension 34 of the spring inserted through an opening 38 provided in handle 28.

The recess 30 provided at the inner end of shaft 26 is two dimensional i.e., the recess has both a narrow and a wide dimension that are generally perpendicular to each other. In FIG. 2 of the drawings the narrow dimension is presented to split end portions 20 of ring 12, which brings the split end portions together against a resilient spring resistance of the ring. When brought together the ring is firmly seated and clamped in the circumferential groove 14 of sleeve 16. Torsion spring 32 maintains the ring in such seated locking position until handle 28 is manually rotated approximately ninety degrees against the torsional force of spring 32. With such rotation, the wide dimension of recess 30 is presented to split end portions 20 of ring 12, which allows ring 12 to move apart. In FIGS. 1 and 4 of the drawings, ring 12 and groove 14 are depicted as being generally rectangular is cross section such that the ring and groove can have relatively sharp inner corners. Such corners provide abutting locking surfaces at the sides of ring and groove when an axial force is longitudinally exerted against the ring. In FIG. 4, such a force is exerted by a coil spring 40. Spring 40 is part of the brake actuator described in the above incorporated Cathcart et al. application.

Using the actuator of FIG. 4, which is designated by numeral 42, as a context for describing the operation of the release mechanism 10 of the invention, when recess 30 at the inner end of shaft 26 is in the position shown in FIG. 2, locking ring 12 is securely clamped in groove 14 of sleeve 16. Spring 40 of actuator 42 is held in compression between a circular seat 43 located adjacent release mechanism 10 of the invention and a spring seat 44 provided in a forward wall 45 of a brake housing 46. Spring seat 43 is attached to an outer sleeve 47 by a retaining ring 48 seated in a circumferential groove 49 provided in the external surface of sleeve 47. Sleeve 47 abuts circular housing 24 at one end of sleeve 47, as seen in FIG. 4, and is connected to a piston parking brake 50 located in housing 46 located at the other end of sleeve 47. A service piston 53 is located behind parking brake piston 50, and engages a second coil spring 55 located behind spring 40. Service piston 53, in addition, is connected to an inner hollow stem 57 while parking brake piston 50 is connected to outer hollow sleeve 47 surrounding stem 57. Within outer sleeve 47 is disposed forwardly located sleeve 16, with sleeve 16 being disposed about an adjustable collet 60. Collett 60 is located on a threaded, brake operating rod 54.

A second, power collet 62 is located on rod 54 at location behind adjustable collet 60, and has a conical bearing surface 64 that faces outwardly toward a corresponding bearing surface 66 of inner stem 57. In addition, collet 62 and stem 57 have respective abutting ledges 68 and 70.

An intermediate sleeve 72 is located between forward sleeve 16 and inner stem 57. Intermediate sleeve 72 has an integral inwardly directed boss 74 that seats behind a retaining ring 76 in FIG. 4 provided on the outer surface of stem 57. In the above Cathcart et al. application, spring 40 exerts an axial force against retaining ring 48 that ordinarily translates and maintains sleeve 16 and center rod 54 in a forward, brake applying position when fluid pressure is removed from piston 50 via a port 52 provided in housing 46. The parking brake of actuator 42 is released and reset pneumatically when compressed air is directed into housing 46 and against piston 50 to move the piston toward a rear wall 56 in the housing.

The present invention is a convenient means to quickly release the parking brake of actuator 42 mechanically i.e., without the need of air pressure being directed to housing 52, by allowing locking ring 12 to slip out of groove 14 in sleeve 16, as expanded below, under the expansion force of spring 40. This releases sleeve 16 to move rearwardly in release mechanism 10 and in outer sleeve 47 toward rear wall 56 which translates center rod 54 in the direction of wall 56 to release the parking brake of actuator 42. Fluid pressure applied to the forward face of piston 50 forces the piston to a partition 58 located in housing 46. Rearward movement of the piston translates sleeves 57 and 72 in a rearward direction. This moves ledge 70 of stem 57 into abutment with ledge 68 of collet 62, which translates threaded rod 54 toward the rear of housing 52. This is the "off" position of the parking brake. The sleeve 16 and rod 54 are connected together in the manner described in the above incorporated Cathcart et al. application.

Sleeve 16 is easily and quickly released when handle 28 of release mechanism 10 is manually and momentarily rotated approximately ninety degrees to present the wide dimension of shaft recess 30 to the split ring portions 20 of ring 12 (FIG. 3). This removes the clamping action provided by the recess, as split ring 12 expands from groove 14 in sleeve 16 and is moved laterally out of groove 14 by the force of spring 40 being applied against retaining ring 48 and the split ring 12.

Lateral movement of split ring 12 from groove 14 in sleeve 16 can be facilitated by providing the inner left hand corner of ring 12 and the left hand corner in groove 14, as shown in FIG. 1, with mating chamfers 17. Such chamfers provide a small inclined planes in the direction of the relative movement between ring 12 and sleeve 16. This eases the ring out of the groove under lateral force of spring 40 which is applied against the ring after the ring is release by mechanism 10.

When handle 28 is rotated to allow split ring 12 to open, and sleeve 16 immediately moves rearwardly, handle 28 is simply released to return to a biased position under the rotational force of torsion spring 32. When split ring 12 returns to groove 14, the ring snaps into place and the torsion of spring 32 completes rotation of recess 30 to a position that clamps split ends 20 of ring 12 together to secure ring 12 in groove 14. The mechanism of the invention allows one to easily open a split ring seated in a groove when the split ring has the resilient capability to open. The "open" ring is then amendable to be pushed from groove by a suitable lateral force. When relative axial movement of the ring and groove cause longitudinal realignment of the two, the ring snaps into place in the groove and is clamped therein by automatic rotation of a clamping recess containing split end portions of the ring.

While a preferred embodiment of the release mechanism of the invention has been described in detail above, it should be understood that other modifications and adaptations of the invention may be made by those persons skilled in the art without departing from the spirit and scope of the claims appended thereto.

We claim:

1. A quick release mechanism comprising:
    a sleeve having an external circumferential groove provided in an outer surface of the sleeve,
    a locking ring located on said sleeve and sized to seat in said circumferential groove, said locking ring being split to provide split-end portions, and
    a rotatable clamping device having a recess for receiving the split-end portions of the locking ring,
    said recess having narrow and wide dimensions that serve to engage and disengage the split-end portions of the locking ring to effect closing of the locking ring in the circumferential groove when the clamping device is rotated to present the narrow dimension to said split-end portions, and to open the locking ring when the wide dimension of the recess is presented to the split-end portions of the locking ring.

2. The quick release mechanism of claim 1 wherein the circumferential groove and locking ring are rectangular in cross section such that the groove and locking ring have substantially right angle mating corners, with one of said mating corners being chamfered.

3. The release mechanism of claim 1 wherein the clamping device includes a shaft having said recess located at one end of the shaft and a handle located at the opposite end,
    the release mechanism further including a housing member supporting said shaft, with said handle being maintained in a rotated position by a torsion spring located on said shaft and between the handle and said housing member.

4. A quick release mechanism for a parking brake actuator used on passenger transit and similar type vehicles, said mechanism comprising:
    a sleeve having an external circumferential groove provided in an outer surface of said sleeve,
    a locking ring located on said sleeve and sized to seat in said circumferential groove, said locking ring being split to provide split-end portions, and
    a rotatable clamping device having a recess for receiving the split-end portions of the locking ring,
    said recess having narrow and wide dimensions that serve to engage and disengage the split-end portions of the locking ring to effect closing of the locking ring in the circumferential groove when the clamping device is rotated to present the narrow dimension to said split-end portions, and to open the locking ring when the wide dimension of the recess is presented to the split-end portions of the locking ring.

5. The quick release mechanism of claim 4 wherein the circumferential groove and locking ring are square or rectangular in cross section such that the groove and locking ring have substantially right angle mating corners, with one of said mating corners being chamfered.

6. The release mechanism of claim 4 wherein the clamping device includes a shaft having said recess located at one end of the shaft and a handle located at the opposite end, with the release mechanism further including a housing member supporting said shaft while said handle is maintained in a rotated position by a torsion spring located on said shaft and between the handle and said housing member.

\* \* \* \* \*